(No Model.) 6 Sheets—Sheet 1.
W. J. PAYNE.
DEVICE FOR DRESSING AND FEEDING TOBACCO.

No. 493,181. Patented Mar. 7, 1893.

Witnesses
Inventor
William J. Payne,
By his Attorneys (No Model.) 6 Sheets—Sheet 3.

W. J. PAYNE.
DEVICE FOR DRESSING AND FEEDING TOBACCO.

No. 493,181. Patented Mar. 7, 1893.

Witnesses Inventor
William J. Payne
By Attorneys (No Model.) 6 Sheets—Sheet 5.

W. J. PAYNE.
DEVICE FOR DRESSING AND FEEDING TOBACCO.

No. 493,181. Patented Mar. 7, 1893.

Witnesses
John Prairie
G. M. Finley

Inventor
William J. Payne,
By his Attorneys
H. W. T. Howard (No Model.) 6 Sheets—Sheet 6.
W. J. PAYNE.
DEVICE FOR DRESSING AND FEEDING TOBACCO.
No. 493,181. Patented Mar. 7, 1893.
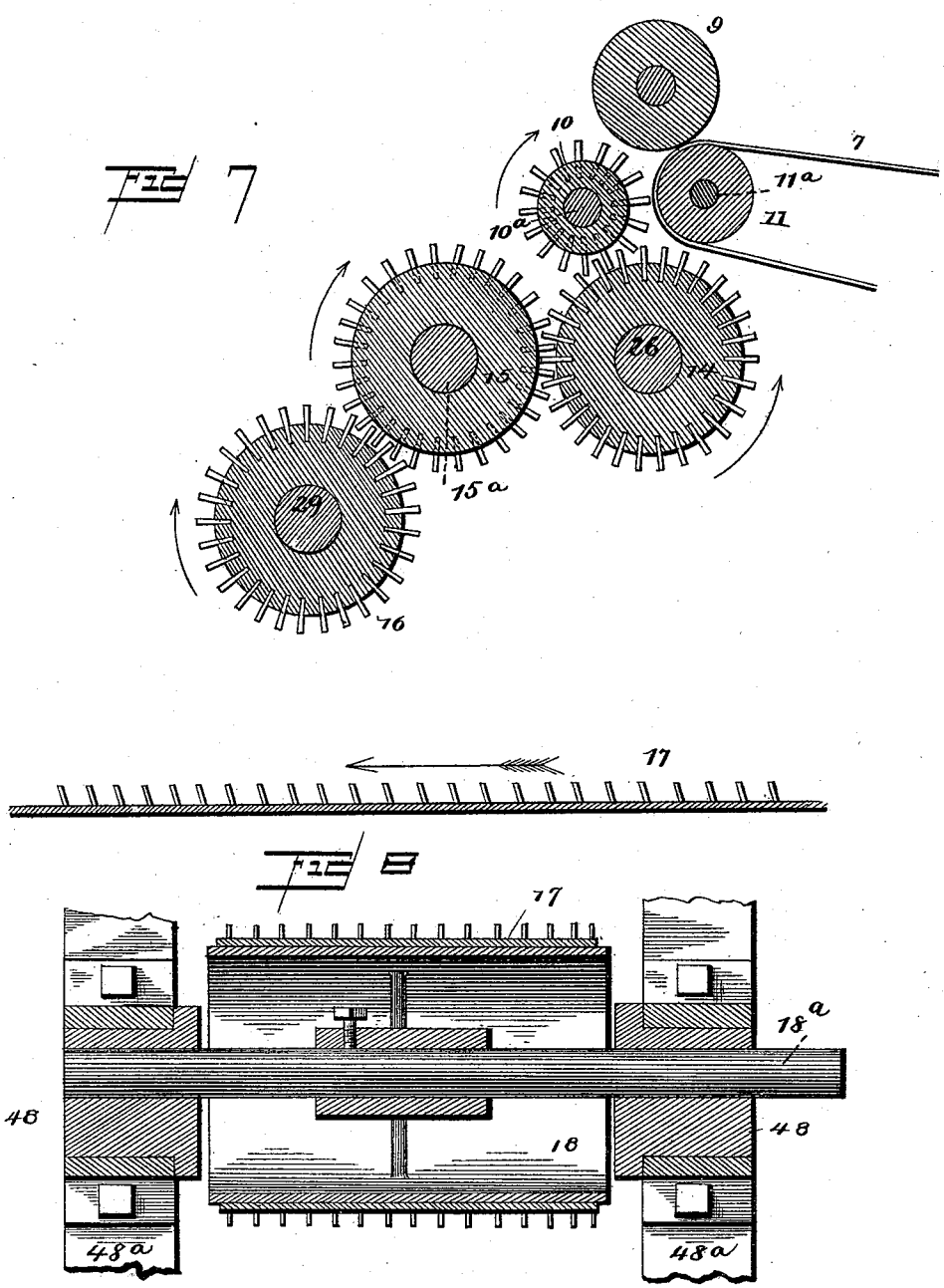

UNITED STATES PATENT OFFICE.

WILLIAM J. PAYNE, OF RICHMOND, VIRGINIA, ASSIGNOR TO THE BOHLS CIGARETTE MACHINE COMPANY, OF SAME PLACE.

DEVICE FOR DRESSING AND FEEDING TOBACCO.

SPECIFICATION forming part of Letters Patent No. 493,181, dated March 7, 1893.

Application filed September 8, 1891. Serial No. 405,115. (No model.)

*To all whom it may concern:*

Be it known that I, WILLIAM J. PAYNE, of Richmond, in the county of Henrico and State of Virginia, have invented certain new and useful Improvements in Devices for Dressing and Feeding Tobacco, of which the following is a specification, reference being had to the accompanying drawings, and to the figures of reference marked thereon.

My invention relates, more particularly, to devices for hackling, disentangling or dressing tobacco so as to prepare it for introduction to a suitable machine for the manufacture of cigarettes.

Figure 1:
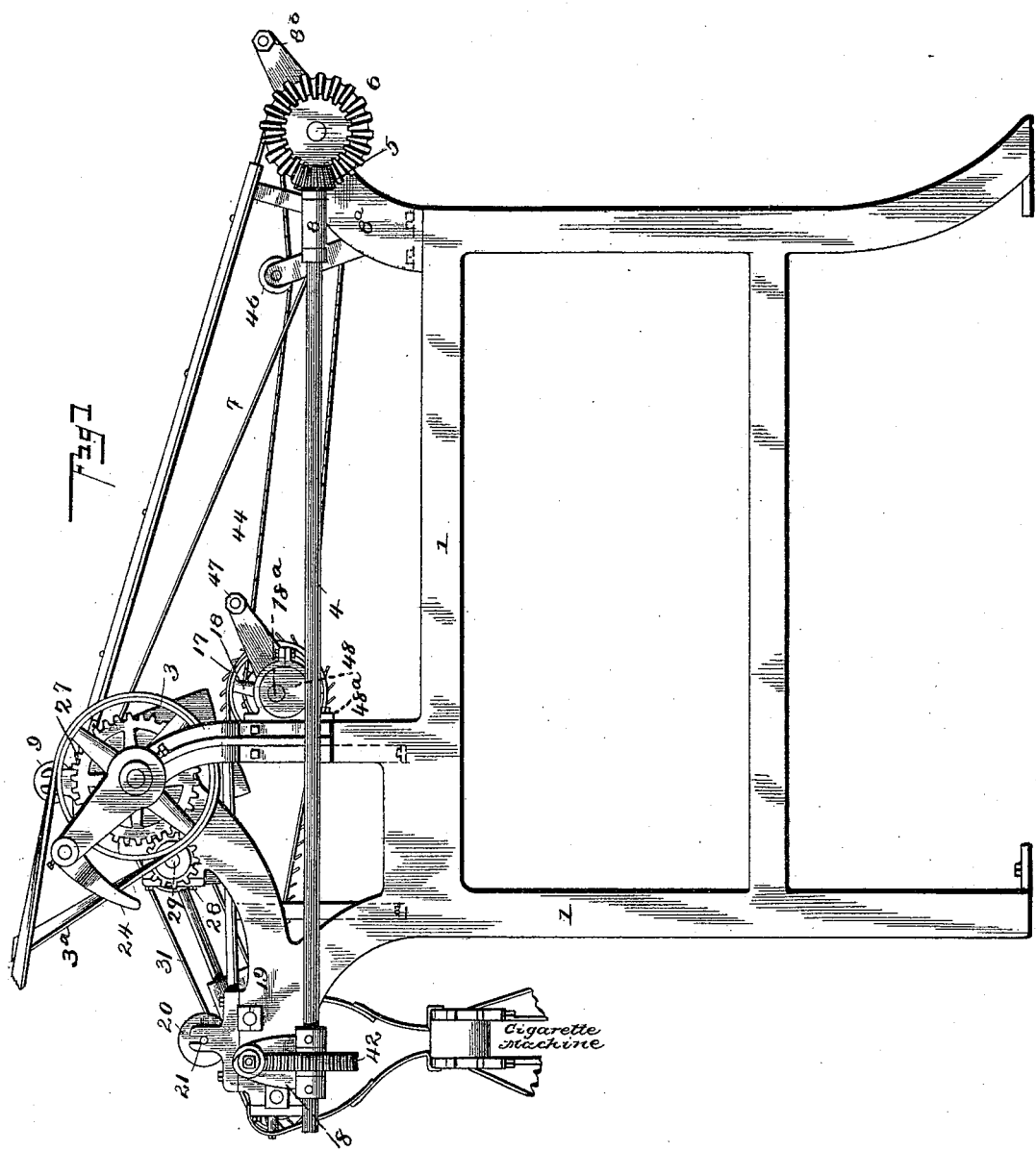
Figure 2:
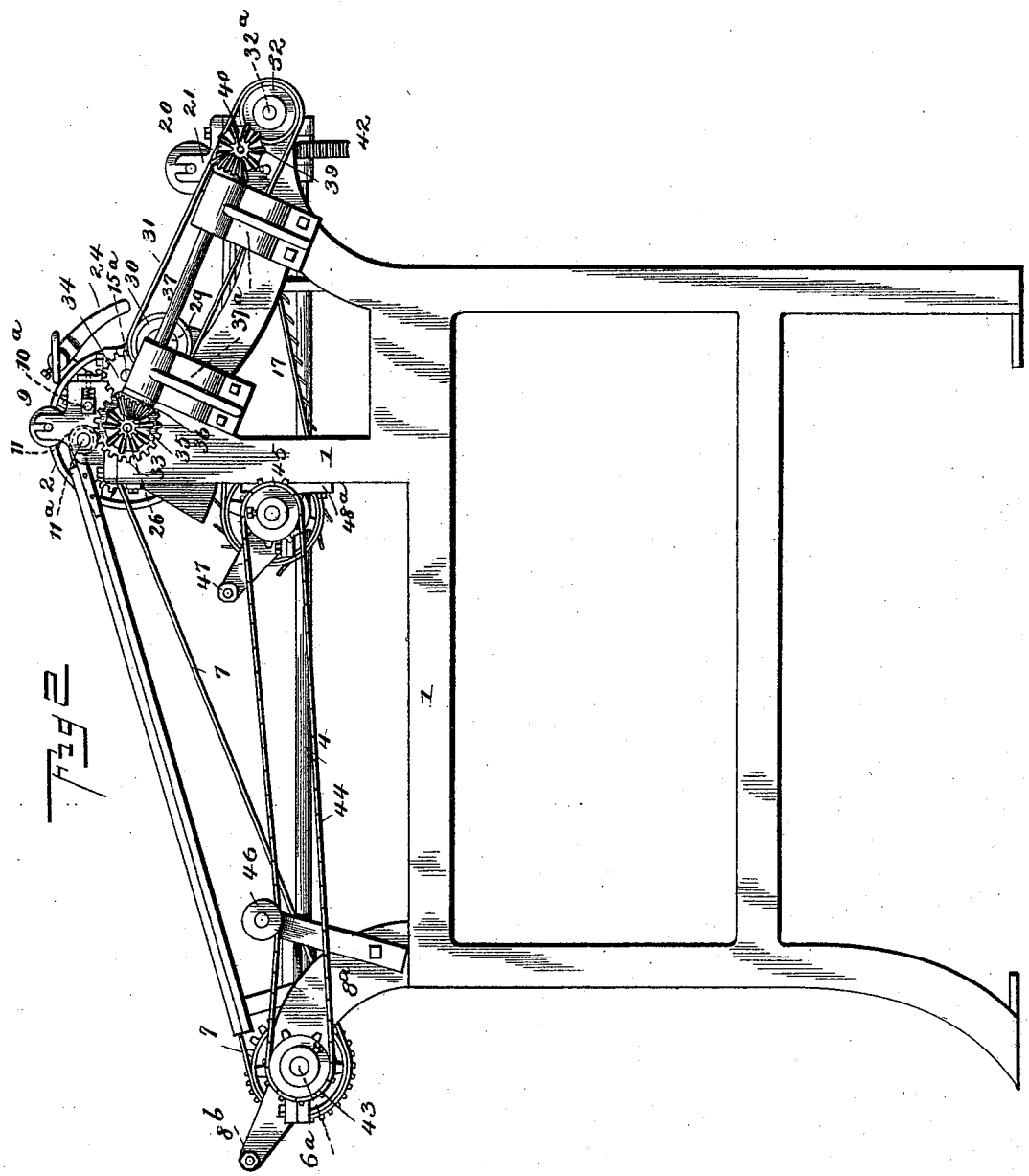
Figure 3:
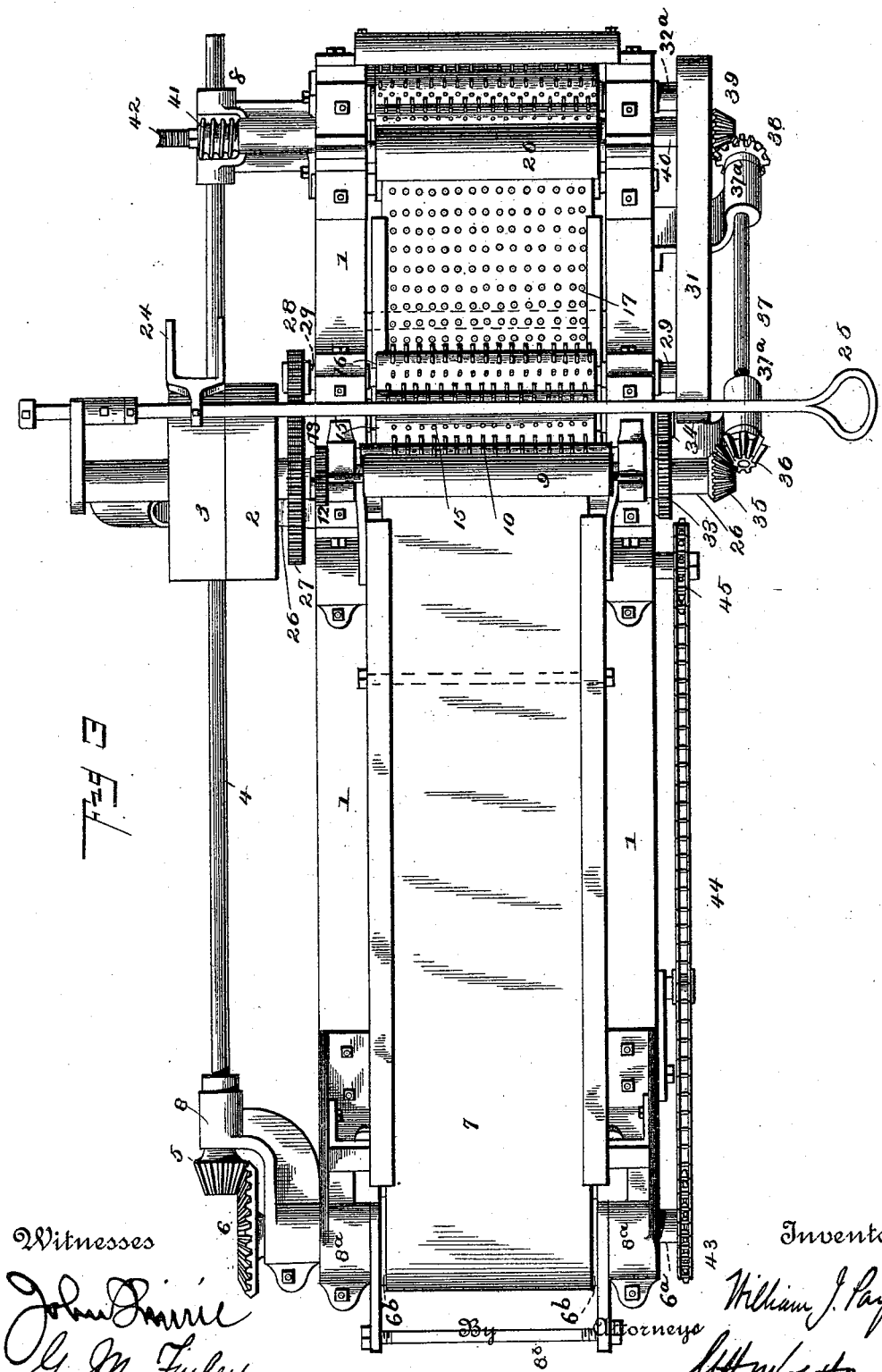
Figure 4:
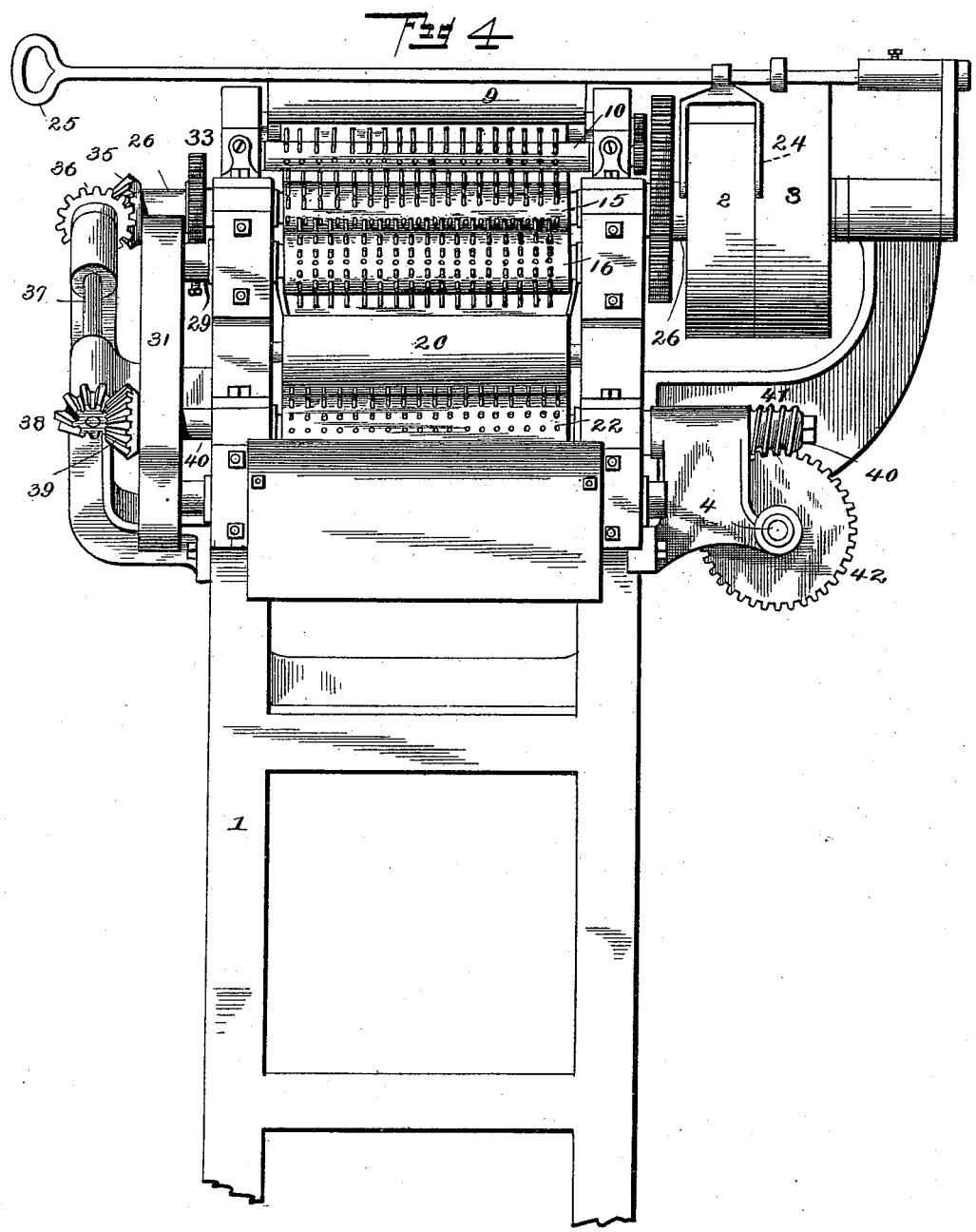
Figure 5:
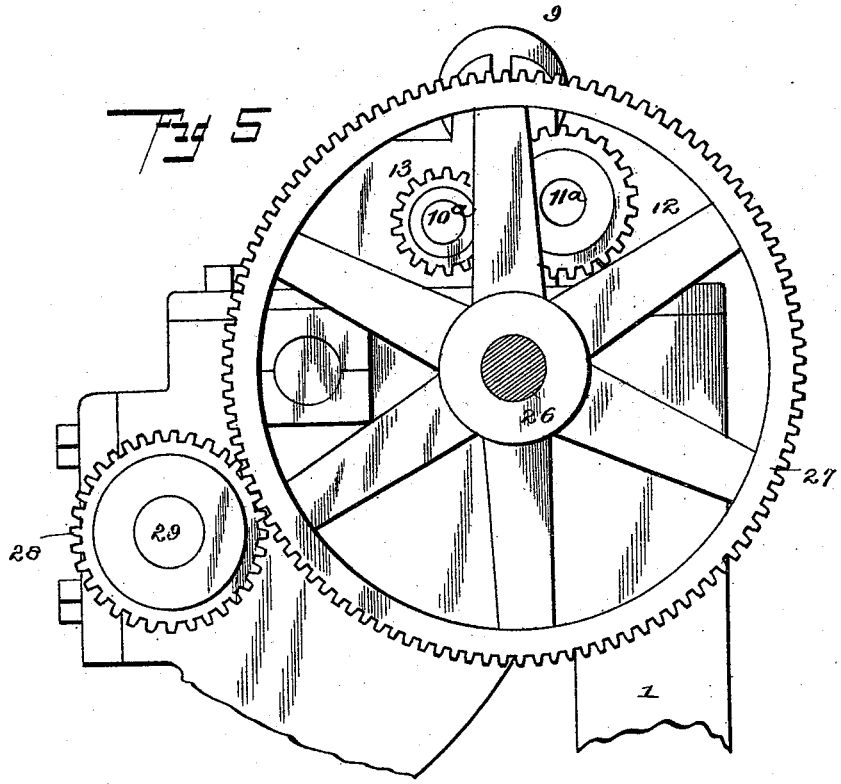
Figure 6:
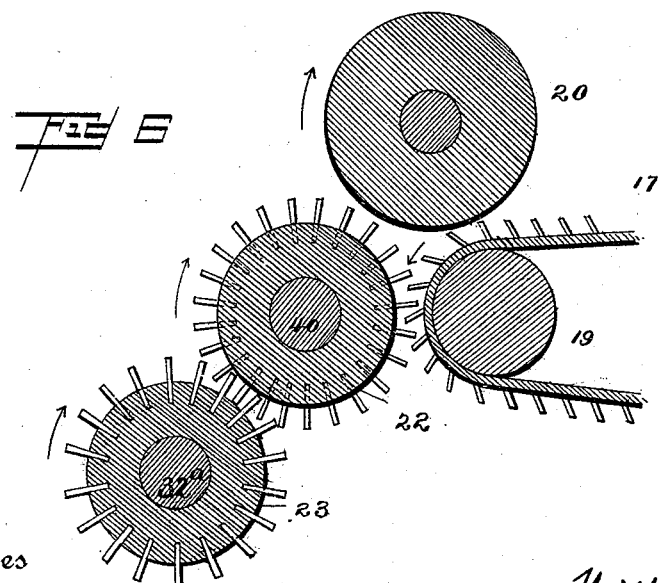

In the drawings, Figure 1 is a side elevation of my invention showing the positions of the pulleys and their shaft for driving the feed belt. Fig. 2 is a similar elevation, viewed from the opposite side, showing the chain belt, the picker belt, and the connecting shaft for driving the upper and lower picker rollers. Fig. 3 is a plan showing the feed belt, the upper and lower picker rollers, the picker belt, and the means generally employed for giving motion to the several parts. Fig. 4 is a front end view showing the upper and lower picker and presser rollers, the driving pulleys and the shifting rod. Fig. 5 is an enlarged side view showing the gearing for driving the pin presser roller and the upper rotary clearer or stripper. Fig. 6 is a side view in section, also enlarged, showing the front or inner end of the picker belt, the lower plain presser roller, the lower picker roller, and the lower rotary clearer or stripper. Fig. 7 is a similar side view in section of the front end of the feed belt, and showing the top plain presser roller, the pin presser roller opposite the end of the feed belt, the two upper picker rollers and the upper rotary clearer or stripper. Fig. 8 is a transverse section of the picker belt, indicating the position of the pins thereon, and showing the driving pulley therefor, and an eccentric bearing for a tightener.

Similar figures of reference indicate similar parts in the respective views.

1 represents the frame of my improved dressing and feeding apparatus.

2 and 3 are respectively, tight and loose driving pulleys.

4 shows a worm shaft, on the end of which is a gear 5 engaging another gear 6, which in turn drives the outer one of the two rollers over which the endless feed belt 7 moves. On the feed belt 7, which is given a slow movement, the tobacco is spread evenly by hand; and as the feed belt moves forward the tobacco passes under the top plain presser roller 9. Below and in advance of the top presser roller 9 and directly opposite the inner end of the feed belt 7, is a pin presser roller 10, seen particularly in Fig. 7. The front or inner end of the feed belt 7 passes around the roller 11, driving it by its friction; and on the end of said roller is a gear 12 engaging a gear 13 on the end of the pin presser roller 10, as shown in Figs. 4 and 5.

As the tobacco passes between the pin presser roller 10 and the feed belt 7, it is caught by the first upper picker roller 14 (Fig. 7), and drawn around between the two picker rollers 14 and 15 which revolve at high speed.

As shown in Fig. 7, the presser roller 10 is provided with pins which mesh with the corresponding pins of the first upper picker roller 14. The object of these pins is to hold back the tobacco as it is continuously fed to the picker roller 14, and to prevent more than the desired quantity from being pulled off as it is caught by said roller. As the picker roller 14 carries the tobacco forward, the tobacco is caught by the second upper picker roller 15, meshing with that 14 and revolving at a still higher speed, which action is for the purpose of more thoroughly hackling and disentangling the matted fibers of tobacco. The upper rotary clearer or stripper 16, which runs with still higher velocity, is intended to clear the second picker roller 15 from the fibers of tobacco. See more particularly Figs. 3, 4 and 7.

The pin presser roller 10 meshes with the first picker roller 14 for a two-fold purpose. First, the pin presser roller 10 moving slowly, as the tobacco is carried rapidly forward by the first picker roller 14, it offers a certain resistance to the tobacco, and allows the said rapidly moving picker roller to more thoroughly disentangle the tobacco: and, secondly, as the pins of the presser roller 10 bury themselves in the tobacco at the point where the feed belt 7 starts upon its return, it is, by meshing with the more rapidly revolving picker roller 14, thoroughly stripped of any particles of tobacco which would otherwise cling to its pins and be carried around with them. As the partly disentangled fibers of tobacco pass through the upper picker rollers 14 and 15, they fall upon the endless picker belt 17, which is distended between the driving pulley 18 and the roller 19, as shown in Fig. 1, and as partly seen in Figs. 2, 6 and 8. The picker belt 17 is given a slow movement, almost uniform with that of the feed belt 7; and as it travels forward the tobacco passes under the lower plain presser roller 20, as will be understood by special reference to Figs. 1, 2, 3, 4 and 6. The lower plain presser roller 20 rests in slotted bearings 21, Figs. 1 and 2; and is driven by the friction of the tobacco as it is carried forward by the picker belt 17, and serves to press the tobacco between the pins of said belt. Directly opposite the forward end of the picker belt, and at the point of its return, is placed the lower picker roller 22 (Fig. 6) revolving at a high speed, and meshing with the pins of the picker belt 17. After the tobacco has been forced into the picker belt by the lower presser roller 20, it is continuously fed forward and pulled off by the lower picker roller 22, the picker belt holding the tobacco and preventing the said picker roller from tearing it off irregularly or more rapidly than it is fed forward. Below, and slightly in advance of and meshing with, the lower picker roller 22, is a lower rotary clearer or stripper 23 which moves at a still higher speed than that of the said picker roller, for the purpose of clearing it from the fibers of tobacco. See more particularly Fig. 6. After the tobacco has passed from the picker belt 17, and through the lower picker roller 22 and lower rotary clearer or stripper 23, the hackling or disentangling or dressing process has been completed; and the tobacco is now ready to be conveyed to a suitable cigarette machine.

The means for driving and giving movement to the different parts of the machine are as follows: A belt is run onto the tight and loose pulleys 2 and 3; 24 being an ordinary shifter for starting and stopping the machine. The pulleys 2 and 3 are mounted upon the shaft 26, which extends transversely of the machine. The first upper picker roller 14 is mounted upon the shaft 26 and driven with it see Figs. 3 and 4. On the shaft 26 is a spur gear 27 which, engaging with the gear 28, drives the shaft 29 upon which is the upper rotary clearer or stripper 16, Fig. 7. On the end of the shaft 29 is a pulley 30, which, by means of the belt 31, drives the pulley 32, on the shaft of which is the lower rotary clearer or stripper 23. See particularly Figs. 2 and 6. On the shaft 26 is a gear 33 which engages with that 34 for driving the second upper picker roller 15, Figs. 2, 3 and 7. On the end of the shaft 26 is a bevel gear 35, engaging a gear 36 upon the shaft 37, on the end of which is a gear 38 engaging that 39 for driving the lower picker roller 22, as shown in Figs. 2, 3, 4 and 6. On the end of the shaft 40, upon which is mounted the lower picker roller 22, Figs. 3 and 6, is a worm 41 which, engaging the worm gear 42, drives the shaft 4, as seen in Figs. 1, 3 and 4. On the end of the shaft 4 is a gear 5, engaging the gear 6 mounted on the shaft 6ª, which gear drives the outer roller of the feed belt 7, Figs. 1 and 3. On the opposite end of the shaft 6ª is a sprocket wheel 43, driving the chain belt 44, which, running over the sprocket wheel 45, drives the picker belt 17.

46 is a tightener for the chain belt 44.

8, 8, Figs. 1 and 3, are adjustable bearings for the ends of the shaft 4.

8ª, Figs. 1 and 2, shows a bracket for carrying the bearing of the roller 11 for the inner end of the feed belt 7.

As a tightener for the feed belt 7 and the picker belt 17, an eccentric bearing is provided, which can be thrown backward or forward by means of the levers 8ᵇ and 47. See Figs. 1, 2 and 3, and also the enlarged transverse section Fig. 8.

While I do not claim anything novel in the use of picker rollers for disentangling tobacco and other fibrous material, I hold that the most perfect results can be obtained only by operating them in the manner herein described.

Having thus described my invention, I claim—

1. In a machine for dressing and feeding tobacco, the combination of an endless feed belt, a plain presser roller, first and second picker rollers, and a pin presser roller whose pins mesh with those of the first picker roller, substantially as set forth.

2. In a machine for dressing and feeding tobacco, the combination with an endless feed belt given a slow movement, of a plain presser roller, first and second picker rollers revolving at high speed and a pin presser roller whose pins mesh with those of the first picker roller, substantially as set forth.

3. In a machine for dressing and feeding tobacco, the combination with an endless feed belt, of a plain presser roller, first and second picker rollers, a pin presser roller whose pins mesh with those of the first picker roller, and a rotary clearer or stripper, substantially as set forth.

4. In a machine for dressing and feeding tobacco, the combination of an endless feed belt given a slow movement, a plain presser roller, first and second picker rollers revolving at high speed, a pin presser roller whose pins mesh with those of the first picker roller, and an upper rotary clearer or stripper having pins meshing with those of the second picker roller, and running at a velocity higher than that of said rollers, substantially as set forth.

5. In a machine for dressing and feeding tobacco, the combination with an endless feed belt, a plain presser roller and picker rollers, of an endless picker belt and a picker roller therefor, substantially as set forth.

6. In a machine for dressing and feeding tobacco, an endless feed belt, a plain presser roller, picker rollers and a rotary clearer or stripper therefor, combined with an endless picker belt and a picker therefor, substantially as set forth.

7. In a machine for dressing and feeding tobacco, an endless feed belt given a slow movement, a plain presser roller, a pin presser roller, picker rollers and a rotary clearer or stripper, said rollers and clearer or stripper having velocities as described, combined with an endless belt, substantially as set forth.

8. In a machine for dressing and feeding tobacco, the combination of an endless picker belt given a slow movement, a plain presser roller and a picker roller, the latter revolving at high speed and meshing with the pins of the picker belt, substantially as set forth.

9. In a machine for dressing and feeding tobacco, the combination of an endless picker belt given a slow movement, a plain presser roller and a picker roller, the latter revolving at high speed and meshing with the picker belt, combined with a rotary clearer or stripper moving at a speed higher than that of said picker roller, substantially as set forth.

10. In a machine for dressing and feeding tobacco, an endless feed belt, a plain presser roller, first and second picker rollers revolving at high speed, a pin presser roller whose pins mesh with those of the first picker roller and a rotary clearer or stripper meshing with the second roller and revolving at still greater velocity, combined with a picker belt given a movement substantially uniform with that of the feed belt, a lower plain presser roller, a lower picker roller whose pins mesh with the picker belt, and which revolves at a speed higher than that of said belt, and a rotary clearer or stripper meshing with said picker roller and revolving at a speed higher than that of said roller, substantially as set forth.

WILLIAM J. PAYNE. [L. S.]

Witnesses:
FRED S. MYERS,
R. T. PARKER.